US010956320B2

(12) United States Patent
Byun

(10) Patent No.: US 10,956,320 B2
(45) Date of Patent: Mar. 23, 2021

(54) MEMORY SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 102 days.

(21) Appl. No.: 16/182,134

(22) Filed: Nov. 6, 2018

(65) Prior Publication Data

US 2019/0303293 A1 Oct. 3, 2019

(30) Foreign Application Priority Data

Apr. 2, 2018 (KR) .................... 10-2018-0038190

(51) Int. Cl.
*G06F 12/00* (2006.01)
*G06F 12/06* (2006.01)

(52) U.S. Cl.
CPC .. *G06F 12/0607* (2013.01); *G06F 2212/1008* (2013.01)

(58) Field of Classification Search
None
See application file for complete search history.

(56) References Cited

U.S. PATENT DOCUMENTS

| 2009/0070547 A1* | 3/2009 | Jeong | G06F 12/0246 711/209 |
| 2013/0173874 A1* | 7/2013 | Sprouse | G06F 12/0246 711/157 |
| 2014/0379959 A1* | 12/2014 | Canepa | G06F 12/0246 711/103 |

FOREIGN PATENT DOCUMENTS

| KR | 1020120135216 | 12/2012 |
| KR | 101482013 | 1/2015 |
| KR | 1020160016896 | 2/2016 |
| KR | 101638064 | 7/2016 |

* cited by examiner

*Primary Examiner* — Daniel D Tsui
(74) *Attorney, Agent, or Firm* — IP & T Group LLP

(57) ABSTRACT

A memory system may include: a memory device including a plurality of memory dies; and a controller including a memory, and configured to: sequentially store, after storing data segments of sequential user data in the memory, the data segments of the sequential user data in the memory dies through interleaving; store in a first buffer region of the memory, after updating map segments of lower level map data corresponding to the storage of the data segments in the memory dies, the map segments of the lower level map data; and store in a second buffer region of the memory map segments of upper level map data corresponding to storage of the map segments of the lower level map data.

2 Claims, 14 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2018-0038190 filed on Apr. 2, 2018, which is incorporated herein by reference in its entirety.

BACKGROUND

1. Field

Various exemplary embodiments of the present invention generally relate to a memory system. Particularly, the embodiments relate to a memory system which processes data with respect to a memory device, and an operating method thereof.

2. Discussion of the Related Art

The computer environment paradigm has shifted towards ubiquitous computing, which allows computer systems to be used anytime and anywhere. As a result, use of portable electronic devices such as mobile phones, digital cameras, and notebook/laptop computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

SUMMARY

Various embodiments are directed to a memory system and an operating method thereof, capable of minimizing complexity and performance deterioration of a memory system and maximizing use efficiency of a memory device, thereby quickly and stably processing data with respect to the memory device.

In an embodiment, a memory system may include: a memory device including a plurality of memory dies; and a controller including a memory, and configured to: sequentially store, after storing data segments of sequential user data in the memory, the data segments of the sequential user data in the memory dies through interleaving; store in a first buffer region of the memory, after updating map segments of lower level map data corresponding to the storage of the data segments in the memory dies, the map segments of the lower level map data; and store in a second buffer region of the memory map segments of upper level map data corresponding to storage of the map segments of the lower level map data.

The controller may store in a first cycle, after storing a first data segment group of the sequential user data in the memory, the first data segment group of the sequential user data in the memory dies through interleaving, and the controller may store in a second cycle after the first cycle, after storing a second data segment group of the sequential user data in the memory, the second data segment group of the sequential user data in the memory dies through interleaving.

The controller may store in the first buffer region, after updating a first lower map segment group of the lower level map data corresponding to the storage of the first data segment group in the memory dies, the first lower map segment group of the lower level map data, and the controller may store in the memory dies the first lower map segment group stored in the first buffer region.

The controller may store in the second buffer region, after updating a first upper map segment group of the upper level map data in correspondence to the storage of the first lower map segment group in the memory dies, the first upper map segment group of the upper level map data, and the controller may store in the memory dies the first upper map segment group stored in the second buffer region.

The controller may load in the second buffer region the first upper map segment group stored in the memory dies in correspondence to the storage of the second data segment group in the memory dies, and the controller may copy to a third buffer region of the memory the first upper map segment group loaded in the second buffer region.

The controller may store, after updating a second lower map segment group of the lower level map data corresponding to the storage of the second data segment group in the memory dies based on the first upper map segment group copied to the third buffer region, the second lower map segment group of the lower level map data in the first buffer region, and the controller may store in the memory dies the second lower map segment group stored in the first buffer region.

The controller may store in the third buffer region, after updating a second upper map segment group of the upper level map data in correspondence to the storage of the second lower map segment group in the memory dies based on the first upper map segment group copied into the third buffer group, the second upper map segment group of the upper level map data, and the controller may swap the second buffer region and the third buffer region.

When updating the second lower map segment group in the second cycle, in the case where read commands for the first data segment group are received from the host, the controller may check the first lower map segment group through the first upper map segment group loaded in the second buffer region.

The controller may update the lower level map data and the upper level map data in which start location information and size information on the map segments are included, and may store the updated lower level map data and upper level map data in the memory dies.

The controller may store the data segments and the map segments in the memory dies through at least one interleaving among channel interleaving, way interleaving and memory die interleaving.

In an embodiment, a method for operating a memory system including a plurality of memory dies and a memory, the method may include: sequentially storing, after storing data segments of sequential user data in the memory, the data segments of the sequential user data in the memory dies through interleaving; store in a first buffer region of the memory, after updating map segments of lower level map data corresponding to the storage of the data segments in the memory dies, the map segments of the lower level map data; and store in a second buffer region of the memory map segments of upper level map data corresponding to storage of the map segments of the lower level map data.

The storing of the data segments in the memory dies may include: storing in a first cycle, after storing a first data segment group of the sequential user data in the memory, the first data segment group of the sequential user data in the memory dies through interleaving; and storing in a second cycle next to the first cycle, after storing a second data segment group of the sequential user data in the memory, the second data segment group of the sequential user data in the memory dies through interleaving.

The storing in the first buffer region may include: storing in the first buffer region, after updating a first lower map segment group of the lower level map data corresponding to the storage of the first data segment group in the memory dies, the first lower map segment group of the lower level map data; and storing in the memory dies the first lower map segment group stored in the first buffer region.

The storing in the second buffer region may include: storing in the second buffer region, after updating a first upper map segment group of the upper level map data in correspondence to the storage of the first lower map segment group in the memory dies, the first upper map segment group of the upper level map data; and storing in the memory dies the first upper map segment group stored in the second buffer region.

The method may further include: loading in the second buffer region the first upper map segment group stored in the memory dies in correspondence to the storage of the second data segment group in the memory dies; and copying to a third buffer region of the memory the first upper map segment group loaded in the second buffer region.

The storing in the first buffer region may further include: storing, after updating a second lower map segment group of the lower level map data corresponding to the storage of the second data segment group in the memory dies bases on the first upper map segment group copied to the third buffer region, the second lower map segment group of the lower level map data in the first buffer region; and storing in the memory dies the second lower map segment group stored in the first buffer region.

The method may further include: storing in the third buffer region, after updating a second upper map segment group of the upper level map data, in correspondence to the storage of the second lower map segment group in the memory dies based on the first upper map segment group copied into the third buffer group, the second upper map segment group of the upper level map data; and swapping the second buffer region and the third buffer region.

The method may further include: receiving, when updating the second lower map segment group in the second cycle, read commands for the first data segment group from the host; and checking the first lower map segment group through the first upper map segment group loaded in the second buffer region.

The method may further include: updating the lower level map data and the upper level map data in which start location information and size information on the map segments are included, and storing the updated lower level map data and upper level map data in the memory dies.

The method may further include: storing the data segments and the map segments in the memory dies through at least one interleaving among channel interleaving, way interleaving and memory die interleaving.

In an embodiment, a memory system may include: a memory device including a plurality of memory dies; first and second buffers; and a controller configured to: control the memory device to perform a program operation of storing first and second sequential user data respectively during first and second cycles into the memory dies in an interleaved manner; update first and second map data respectively corresponding to the first and second sequential user data; and update first and second map location data indicating locations of the first and second map data stored in the memory dies. The controller may update the first and second map location data by: loading the first map location data onto the first buffer and updating the loaded first map location data; loading the first map location data onto the second buffer and updating the first map location data as the second map location data according to the update of the second map data stored in the memory dies; and overwriting the updated second map location data onto the first buffer.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
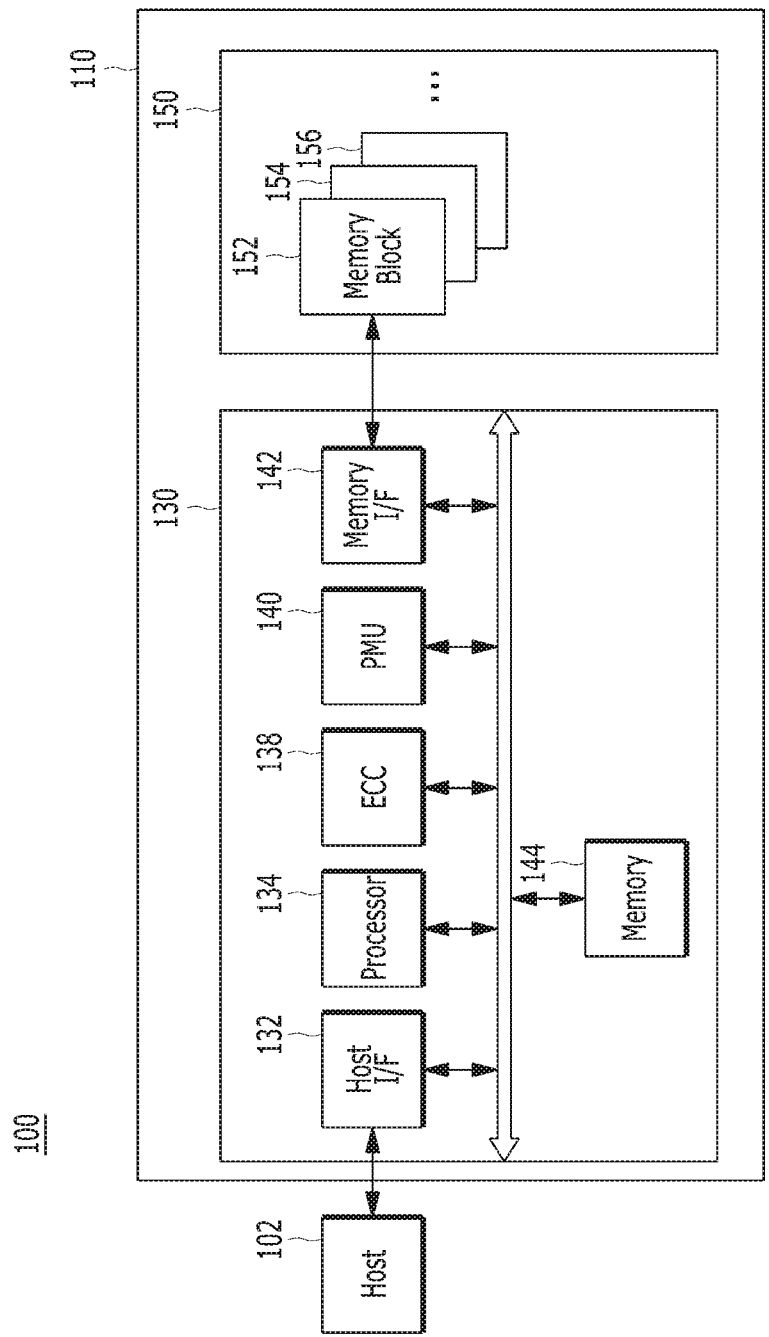
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention. It is noted that reference to "an embodiment" does not necessarily mean only one embodiment, and different references to "an embodiment" are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well and vice versa, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The memory system 110 may store data for the host 102 in response to a request of the host 102. Non-limiting examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limiting examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152, 154, 156 . . . (hereinafter, referred to as "memory blocks 152 to 156"), each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a memory interface 142 such as a NAND flash controller (NFC), and a memory 144 all operatively coupled via an internal bus.

The host interface 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success/fail signal. When the number of error bits is more than a threshold value of correctable error bits, the ECC component 138 may not correct the error bits, and may output an error correction fail signal.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited thereto. The ECC component 138 may include all circuits, modules, systems or devices for error correction.

The PMU 140 may provide and manage power of the controller 130.

The memory interface 142 may serve as a memory/storage interface for interfacing the controller 130 and the memory device 150 such that the controller 130 controls the memory device 150 in response to a request from the host 102. When the memory device 150 is a flash memory, or specifically a NAND flash memory, the memory interface 142 may generate a control signal for the memory device 150 and process data to be provided to the memory device 150 under the control of the processor 134. The memory interface 142 may work as an interface (e.g., a NAND flash interface) for processing a command and data between the controller 130 and the memory device 150. Specifically, the memory interface 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

In a memory system 110 in accordance with an embodiment of the present disclosure, for instance, the controller 130 may perform a plurality of command operations corresponding to a plurality of commands received from the host 102, in the memory device 150. For example, the controller 130 may perform, in the memory device 150, a plurality of program operations corresponding to a plurality of write commands, a plurality of read operations corresponding to a plurality of read commands, and a plurality of erase operations corresponding to a plurality of erase commands. In correspondence to performing of command operations, the controller 130 may perform a map update operation and a map flush operation for metadata, in particular, map data.

In the memory system 110 in accordance with the embodiment of the present disclosure, when performing command operations corresponding to a plurality of commands received from the host 102, for example, program operations, read operations and erase operations, in a plurality of memory dies included in the memory device 150, the controller 130 may perform a map update operation and a map flush operation corresponding to the command operations respectively performed in the plurality of memory dies. In particular, in the case where data corresponding to commands are sequential data, after performing sequential program operations and sequential read operations, the controller 130 may perform a map update operation and a map flush operation corresponding to the sequential program operations and the sequential read operations. In the case where the pattern of commands received from the host 102 is a sequential pattern, the controller 130 may perform sequential command operations. In particular, in the case where the pattern of write commands received from the host 102 is a sequential write pattern, the controller 130 may perform sequential program operations for sequential data. In the case where the pattern of read commands received from the host 102 is a sequential read pattern, the controller 130 may perform sequential read operations for sequential data.

In the memory system 110 in accordance with the embodiment of the present disclosure, the memory device 150 includes a plurality of memory dies which are coupled to a plurality of channels and a plurality of ways. In the case where the controller 130 performs commands operations in the memory dies of the memory device 150, the command operations are performed in consideration of channel interleaving, way interleaving, and memory die interleaving, and a map update operation and a map flush operation are performed corresponding to the command operations respectively performed in the plurality of memory dies. In particular, in the case where data corresponding to commands are sequential data, after performing sequential program operations and sequential read operations in the memory dies of the memory device 150 in consideration of interleaving, the controller 130 may perform a map update operation and a map flush operation corresponding to the sequential program operations and the sequential read operations. Since detailed descriptions will be made below with reference to FIGS. 5 to 10 for performing of command operations for the memory dies of the memory device 150 in consideration of interleaving, and a map update operation and a map flush operation corresponding to the performing of the command operations, further descriptions thereof will be omitted herein.

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
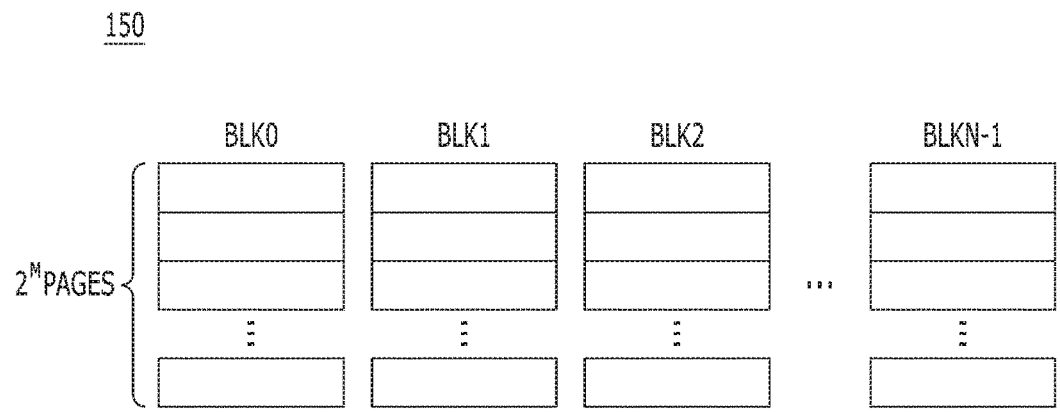
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks BLK0 to BLKN−1, and each of the memory blocks BLK0 to BLKN−1 may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
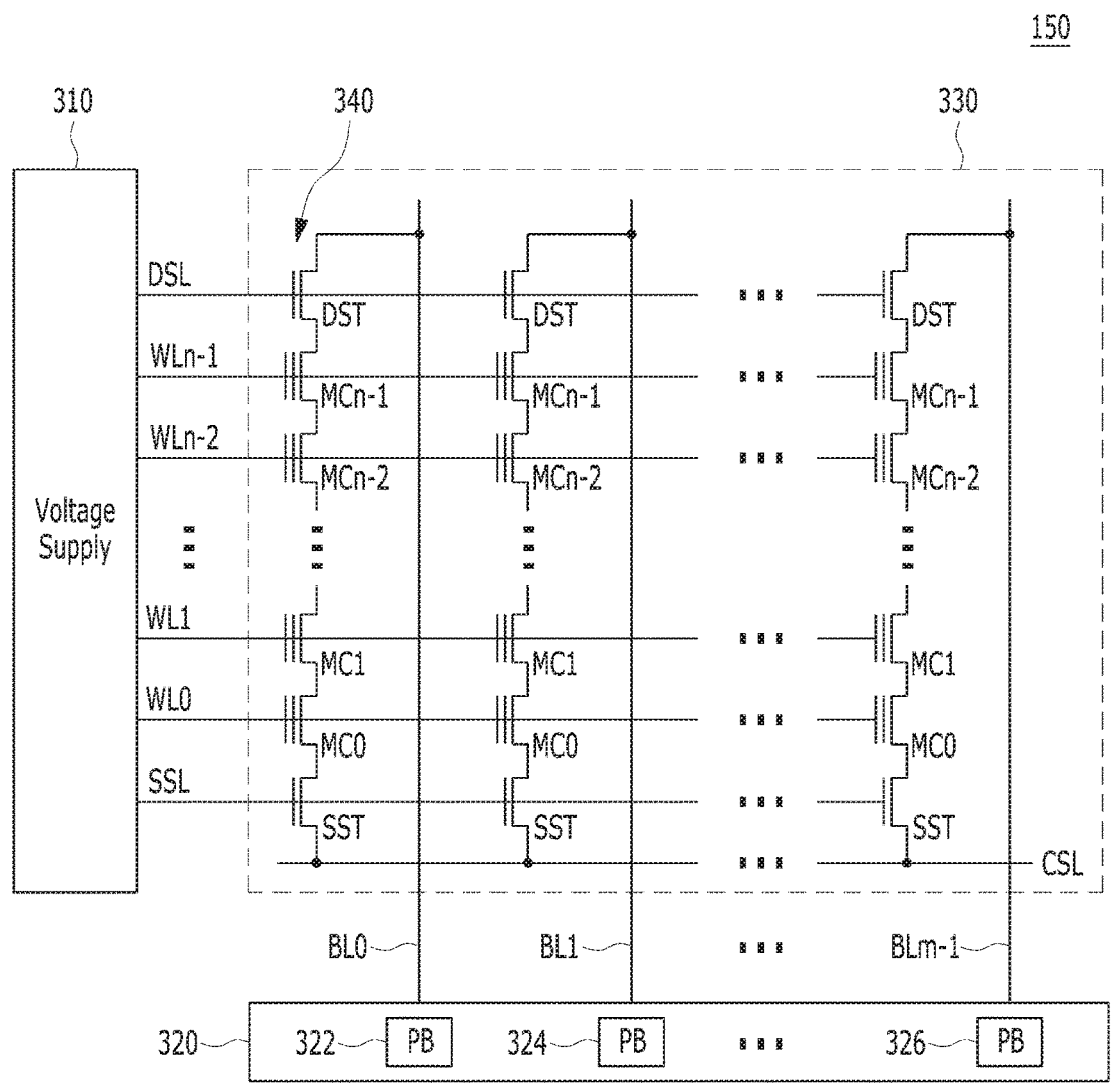
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block 330 in the memory device 150.

Referring to FIG. 3, the memory block 330 may correspond to any memory block among the plurality of memory blocks 152 to 156 included in the memory device 150 shown in FIG. 1. The memory block 330 may include a plurality of cell strings 340 coupled to a plurality of corresponding bit lines BL0 to BLm−1. The cell string 340 of each column may include one or more drain select transistors DST and one or more source select transistors SST. Between the source and drain select transistors SST and DST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. A control circuit (not illustrated) may control the voltage generation operation of the voltage supply 310. Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from a certain the memory cell array of the memory block 330. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers (PBs) 322 to 326 respectively corresponding to columns (or bit lines) or column pairs (or bit line pairs). Each of the page buffers 322 to 326 may include a plurality of latches (not illustrated).

Figure 4:
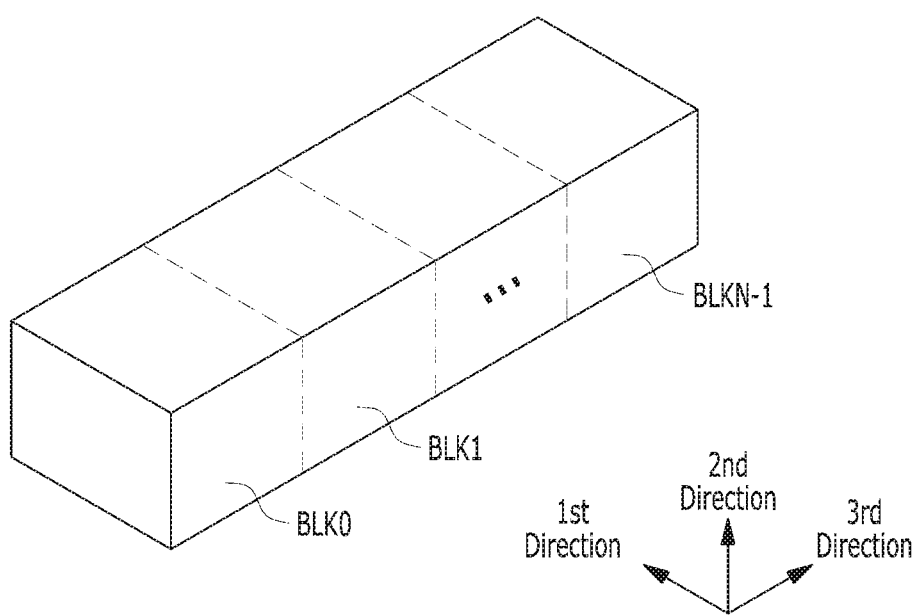
FIG. 4 is a schematic diagram illustrating an exemplary three-dimensional structure of the memory device shown in FIG. 2.

FIG. 4 is a schematic diagram illustrating an exemplary three-dimensional (3D) structure of the memory device 150.

The memory device 150 may be embodied by a two-dimensional (2D) or a 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Hereinbelow, detailed descriptions will be made with reference to FIGS. 5 to 10 for a data processing operation with respect to the memory device 150 in the memory system in accordance with the embodiment. Particularly, a data processing operation when performing, in the memory device 150, command operations corresponding to a plurality of commands received from the host 102 will be described in more detail.

FIGS. 5 to 9 are examples of schematic diagrams illustrating a data processing operation when performing a foreground operation and a background operation for a memory device in a memory system in accordance with an embodiment. In the embodiment of the present disclosure, detailed descriptions will be made by taking as an example a case where foreground operations for the memory device 150, for example, a plurality of command operations corresponding to a plurality of commands received from the host 102, are performed and background operations for the memory device 150, for example, a garbage collection operation or a read reclaim operation as a copy operation, a wear leveling operation as a swap operation or a map update operation and a map flush operation, are performed. In particular, in the embodiment of the present disclosure, for the sake of convenience in explanation, detailed descriptions will be made by taking as an example a case where, in the memory system 110 shown in FIG. 1, a plurality of commands are received from the host 102 and command operations corresponding to the commands are performed. For example, in the embodiment of the present disclosure, detailed descriptions will be made for a data processing operation when a plurality of write commands are received from the host 102 and program operations corresponding to the write commands are performed, when a plurality of read commands are received from the host 102 and read operations corresponding to the read commands are performed, when a plurality of erase commands are received from the host 102 and erase operations corresponding to the erase commands are performed, and when a plurality of write commands and a plurality of read commands are received together from the host 102 and program operations and read operations corresponding to the write commands and the read commands are performed.

Moreover, in the embodiment of the present disclosure, descriptions will be made by taking as an example a case where, after storing write data corresponding to a plurality of write commands received from the host 102, in the buffer/cache included in the memory 144 of the controller 130, the write data stored in the buffer/cache are programmed to and stored in the plurality of memory blocks included in the memory device 150, and, after updating map data corresponding to the storing of the write data in the plurality of memory blocks, the updated map data are stored in the plurality of memory blocks included in the memory device 150. That is, in the embodiment of the present disclosure, descriptions will be made by taking as an example a case where program operations corresponding to a plurality of write commands received from the host 102 are performed. Furthermore, in the embodiment of the present disclosure, descriptions will be made by taking as an example a case where, when a plurality of read commands are received from the host 102 for the data stored in the memory device 150, data corresponding to the read commands are read from the memory device 150 by checking the map data of the data corresponding to the read commands, and, after storing the read data in the buffer/cache included in the memory 144 of the controller 130, the data stored in the buffer/cache are provided to the host 102. In other words, in the embodiment of the present disclosure, descriptions will be made by taking as an example a case where read operations corresponding to a plurality of read commands received from the host 102 are performed. In addition, in the embodiment of the present disclosure, descriptions will be made by taking as an example a case where, when a plurality of erase commands are received from the host 102 for the memory blocks included in the memory device 150, after checking memory blocks corresponding to the erase commands, the data stored in the checked memory blocks are erased, and, after updating map data corresponding to the erased data, the updated map data are stored in the plurality of memory blocks included in the memory device 150. Namely, in the embodiment of the present disclosure, descriptions will be made by taking as an example a case where erase operations corresponding to a plurality of erase commands received from the host 102 are performed.

Further, while, in the embodiment of the present disclosure, it will be described below as an example for the sake of convenience in explanation that the controller 130 performs command operations in the memory system 110, the present invention is not limited thereto. That is, as described above, the processor 134 included in the controller 130 may perform command operations in the memory system 110, through, for example, an FTL (flash translation layer). Also, in the embodiment of the present disclosure, the controller 130 may program and store user data and metadata corresponding to write commands received from the host 102, in arbitrary memory blocks among the plurality of memory blocks included in the memory device 150, may read user data and metadata corresponding to read commands received from the host 102, from arbitrary memory blocks among the plurality of memory blocks included in the memory device 150, and provide the read data to the host 102, or may erase user data and metadata corresponding to erase commands received from the host 102, from arbitrary memory blocks among the plurality of memory blocks included in the memory device 150.

Metadata may include first map data including a logical to physical (L2P) information (hereinafter, referred to as a 'logical information') and second map data including a physical to logical (P2L) information (hereinafter, referred to as a 'physical information'), for data stored in memory blocks in correspondence to a program operation. The metadata may include third map data for the first map data in which the logical information is included and the second map data in which the physical information is included. In the third map data, a map information including a location information for each of the first map data and the second map data is included. The third map data becomes upper level map data of the first map data and the second map data. In the embodiment of the present disclosure, for the sake of convenience in explanation, detailed descriptions will be made by taking as an example a case where the first map data in which the logical information is included and the second map data in which the physical information is included are lower level map data and the third map data is upper level map data.

Also, the metadata may include an information on command data corresponding to a command received from the host 102, an information on a command operation corresponding to the command, an information on the memory blocks of the memory device 150 for which the command operation is to be performed, and an information on map data corresponding to the command operation. In other words, metadata may include all remaining information and data excluding user data corresponding to a command received from the host 102.

That is, in the embodiment of the present disclosure, in the case where the controller 130 receives a plurality of write commands from the host 102, program operations corresponding to the write commands are performed, and user data corresponding to the write commands are written and stored in empty memory blocks, open memory blocks or free memory blocks for which an erase operation has been performed, among the memory blocks of the memory device 150. Also, first map data, including an L2P map table or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks or free memory blocks among the memory blocks of the memory device 150.

Here, in the case where write commands are received from the host 102, the controller 130 may write and store user data corresponding to the write commands in memory blocks, and may store, in memory blocks, metadata including first map data and second map data for the user data stored in the memory blocks. In particular, in correspondence to the data segments of the user data that are stored in the memory blocks of the memory device 150, the controller 130 may generate and update the L2P segments of first map data and the P2L segments of second map data as the map segments of map data among the meta segments of metadata, and then, may store them in the memory blocks of the memory device 150. The map segments stored in the memory blocks of the memory device 150 are loaded in the memory 144 included in the controller 130 and are then updated. Further, in correspondence to the update of the L2P segments of first map data and the P2L segments of second map data, the controller 130 may update the map segments of third map data. The map segments of third map data become map segments in which map information on the L2P segments of first map data and the P2L segments of second map data are included. That is, the map segments of upper level map data include map information in which location information on the map segments of lower level map data are included.

Further, in the case where a plurality of read commands are received from the host 102, the controller 130 may read read data corresponding to the read commands, from the memory device 150, store the read data in the buffers/caches included in the memory 144 of the controller 130, and then, provide the data stored in the buffers/caches, to the host 102, by which read operations corresponding to the plurality of read commands are performed.

In addition, in the case where a plurality of erase commands are received from the host 102, the controller 130 may check memory blocks of the memory device 150 corresponding to the erase commands, and then, perform erase operations for the memory blocks.

As command operations corresponding to a plurality of commands received from the host 102 are performed, in the case where a background operation, for example, a garbage collection operation or a read reclaim operation as a copy operation, a wear leveling operation as a swap operation or a map update operation and a map flush operation, is performed, the controller 130 may load and store data corresponding to the background operation, that is, metadata and user data, in the buffer/cache included in the memory 144 of the controller 130, and then store the data, that is, the metadata and the user data, in the memory device 150. For instance, when performing a background operation, the controller 130 may check metadata and user data corresponding to the background operation, in the memory blocks of the memory device 150, load and store the metadata and user data stored in certain memory blocks of the memory device 150, in the buffer/cache included in the memory 144 of the controller 130, and then may store the metadata and user data, in certain other memory blocks of the memory device 150.

In particular, in the memory system, for example the memory system 110 shown in FIG. 1, in accordance with the embodiment of the present disclosure, the memory device 150 may include a plurality of memory dies which are coupled to a plurality of channels and a plurality of ways. In the case where the controller 130 performs commands operations in the memory dies of the memory device 150, the command operations are performed in consideration of channel interleaving, way interleaving and memory die interleaving, and a map update operation and a map flush operation are performed in correspondence to the command operations respectively performed in the plurality of memory dies. In particular, in the case where data corresponding to commands are sequential data, after performing sequential program operations and sequential read operations in the memory dies of the memory device 150 in consideration of interleaving, the controller 130 may perform a map update operation and a map flush operation corresponding to the sequential program operations and the sequential read operations. Hereinbelow, a data processing operation in the memory system in accordance with the embodiment will be described in detail with reference to FIGS. 5 to 9.

Figure 5:
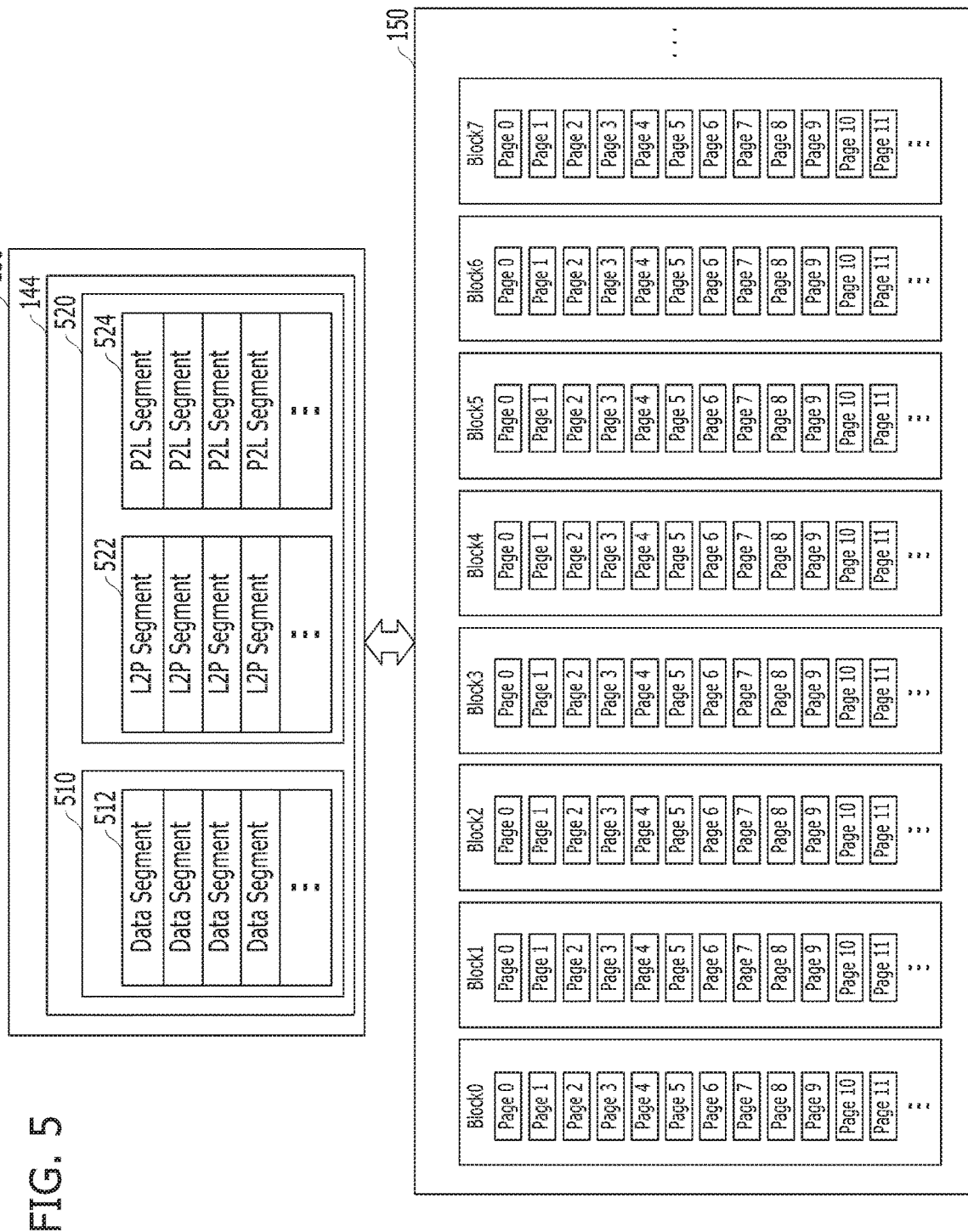
FIGS. 5 to 9 are examples of schematic diagrams illustrating a data processing operation in a memory system in accordance with an embodiment.

Referring to FIG. 5, the controller 130 may perform command operations corresponding to a plurality of commands received from the host 102, for example, program operations corresponding to a plurality of write commands received from the host 102. At this time, the controller 130 may program and store user data corresponding to the write commands, in memory blocks (for example, memory blocks Block0 to Block7 of FIG. 5 which may correspond to the plurality of memory blocks 152 to 156 of FIG. 1) of the memory device 150. Also, in correspondence to the program operations with respect to the memory blocks, the controller 130 may generate and update metadata for the user data and stores the metadata in the memory blocks of the memory device 150.

The controller 130 may generate and update first map data and second map data which include information indicating that the user data are stored in pages (for example, pages Page 0 to Page 11 included in each of the memory blocks Block0 to Block7 of FIG. 5) included in the memory blocks of the memory device 150. That is, the controller 130 may generate and update L2P segments as the logical segments of the first map data and P2L segments as the physical segments of the second map data, and then store them in pages included in the memory blocks of the memory device 150.

For example, the controller 130 may cache and buffer the user data corresponding to the write commands received from the host 102, in a first buffer 510 included in the memory 144 of the controller 130. For example, after storing data segments 512 of the user data in the first buffer 510 as a data buffer/cache, the controller 130 may store the data segments 512 stored in the first buffer 510, in pages included in the memory blocks of the memory device 150. As the data segments 512 of the user data corresponding to the write commands received from the host 102 are programmed to and stored in the pages included in the memory blocks of the memory device 150, the controller 130 may generate and update the first map data and the second map data, and store them in a second buffer 520 included in the memory 144 of the controller 130. For example, the controller 130 may store L2P segments 522 of the first map data and P2L segments 524 of the second map data for the user data, in the second buffer 520 as a map buffer/cache. In the second buffer 520 in the memory 144 of the controller 130, the L2P segments 522 of the first map data and the P2L segments 524 of the second map data may be stored, or a map list for the L2P segments 522 of the first map data and a map list for the P2L segments 524 of the second map data may be stored. The controller 130 may store the L2P segments 522 of the first map data and the P2L segments 524 of the second map data which are stored in the second buffer 520, in pages included in the memory blocks of the memory device 150. Also, the controller 130 may generate and update third map data in which map information on the L2P segments 522 of the first map data and map information on the P2L segments 524 of the second map data are included, and then, store the third map data in the second buffer 520 included in the memory 144 of the controller 130. In the map information of the third map data, the location information of the L2P segments 522 of the first map data and the P2L segments 524 of the second map data are included in the form of a list or a table. That is, in the third map data, map information indicating the locations of the first map data and the second map data may be included. In correspondence to the update of the first map data and the second map data, the controller 130 may update the third map data stored in the second buffer 520, and store the third map data stored in the second buffer 520, in the pages included in the memory blocks of the memory device 150.

Also, the controller 130 may perform command operations corresponding to a plurality of commands received from the host 102, for example, read operations corresponding to a plurality of read commands received from the host 102. In particular, the controller 130 may load L2P segments 522 of first map data and P2L segments 524 of second map data as the map segments of user data corresponding to the read commands, in the second buffer 520, and check the L2P segments 522 and the P2L segments 524. Then, the controller 130 may read the user data stored in pages of corresponding memory blocks among the memory blocks of the memory device 150, store data segments 512 of the read user data in the first buffer 510, and then provide the data segments 512 to the host 102. In this regard, the controller 130 may check the map information of the L2P segments 522 of the first map data and the P2L segments 524 of the second map data, through the third map data, and then, load the L2P segments 522 of the first map data and the P2L segments 524 of the second map data, in the second buffer 520.

Furthermore, the controller 130 may perform command operations corresponding to a plurality of commands received from the host 102, for example, erase operations corresponding to a plurality of erase commands received from the host 102. In particular, the controller 130 may check memory blocks corresponding to the erase commands among the memory blocks of the memory device 150, and perform the erase operations for the checked memory blocks.

When performing an operation of copying data or swapping data among the memory blocks included in the memory device 150, for example, background operations such as a garbage collection operation, a read reclaim operation or a wear leveling operation, the controller 130 may store data segments 512 of corresponding user data, in the first buffer 510, loads map segments 522 and 524 of map data corresponding to the user data, in the second buffer 520, and then perform the garbage collection operation, the read reclaim operation or the wear leveling operation. When performing, as a background operation, a map update operation and a map flush operation for metadata, for example, map data, for the memory blocks of the memory device 150, the controller 130 may load the corresponding map segments 522 and 524 in the second buffer 520, and then perform the map update operation and the map flush operation. Further, in correspondence to the map update operation and the map flush operation for the map segments 522 and 524, the controller 130 may update and store the third map data.

In particular, when performing program operations and read operations in the memory device 150 including a plurality of memory dies which are coupled to a plurality of channels and a plurality of ways as described above, the controller 130 may perform program operations and read operations in consideration of channel interleaving, way interleaving and memory die interleaving, and, in correspondence to the command operations respectively performed in the plurality of memory dies, perform a map update operation and a map flush operation. In the case where data corresponding to commands are sequential data, after performing sequential program operations and sequential read operations in the memory dies of the memory device 150 in consideration of interleaving, the controller 130 may perform a map update operation and a map flush operation in correspondence to the sequential program operations and the sequential read operations. The controller 130 may store sequential user data corresponding to the sequential program operations and the sequential read operations, in the first buffer 510 included in the memory 144 of the controller 130, and store sequential map data corresponding to the sequential program operations and the sequential read operations, in the second buffer 520 included in the memory 144 of the controller 130.

Figure 6:
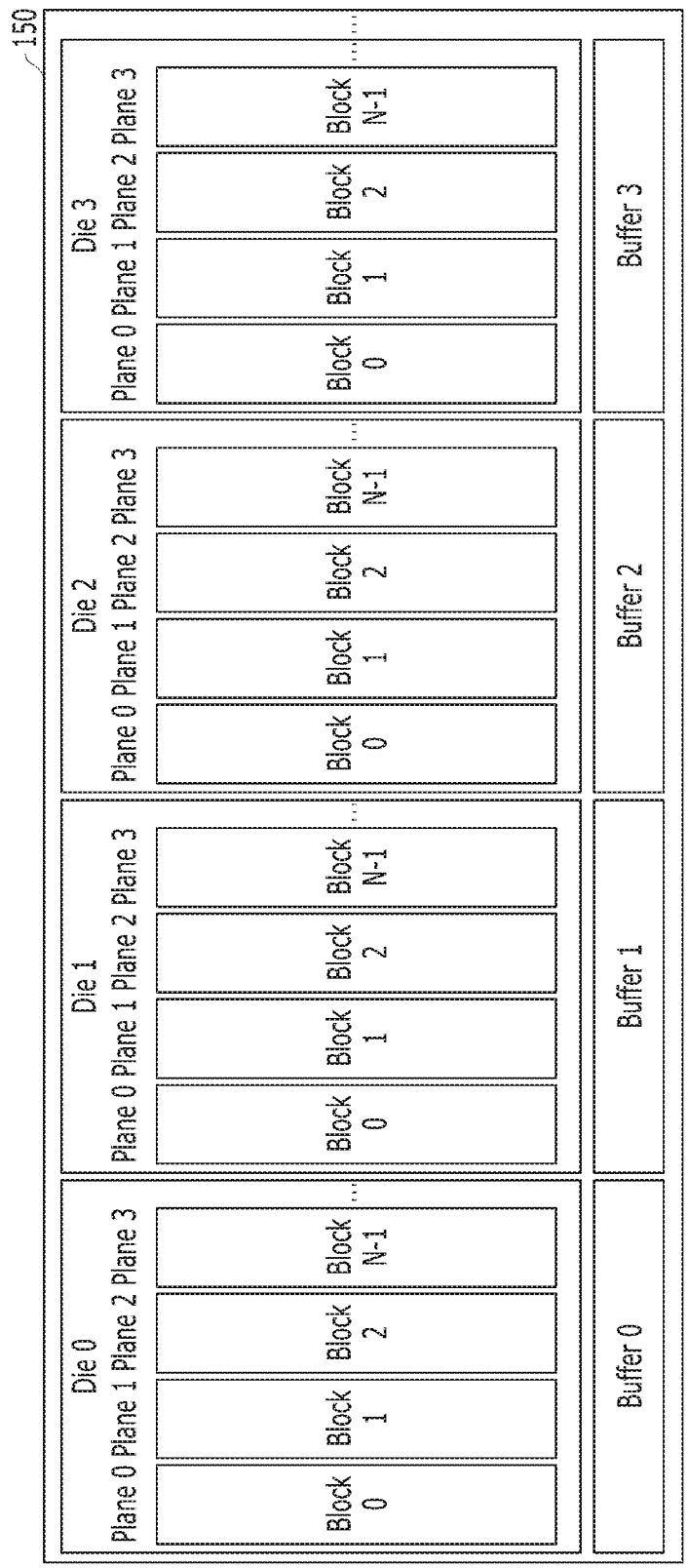

Referring to FIG. 6, the memory device 150 may include a plurality of memory dies, for example, a memory die 0 (denoted as "Die 0"), a memory die 1 (denoted as "Die 1"), a memory die 2 (denoted as "Die 2"), and a memory die 3 (denoted as "Die 3"). Each of the memory dies may include a plurality of planes, for example, a plane 0 (denoted as "Plane 0"), a plane 1 (denoted as "Plane 1"), a plane 2 (denoted as "Plane 2"), and a plane 3 (denoted as "Plane 3"). The respective planes in the memory dies included in the memory device 150 may include a plurality of memory blocks, for example, N number of blocks Block0, Block1, . . . , BlockN−1 each including a plurality of pages, for example, 2^M number of pages, as described above with reference to FIG. 2. Moreover, the memory device 150 may include a plurality of buffers corresponding to the respective memory dies, for example, a buffer 0 (denoted as "Buffer 0") corresponding to the memory die 0, a buffer 1 (denoted as "Buffer 1") corresponding to the memory die 1, a buffer 2 (denoted as "Buffer 2") corresponding to the memory die 2, and a buffer 3 (denoted as "Buffer 3") corresponding to the memory die 3.

When performing command operations corresponding to a plurality of commands received from the host 102, data corresponding to the command operations may be stored in the buffers included in the memory device 150. For example, when performing program operations, data corresponding to the program operations may be stored in the buffers, and may then be stored in the pages included in the memory blocks of the memory dies. When performing read operations, data corresponding to the read operations may be read from the pages included in the memory blocks of the memory dies, may be stored in the buffers, and may then be provided to the host 102 through the controller 130.

Although FIG. 6 shows, as an example and for illustrative purposes, that the buffers included in the memory device 150 exist outside the respective corresponding memory dies, the present invention is not limited thereto. That is, the buffers may exist inside the respective corresponding memory dies, and it is to be noted that the buffers may correspond to the respective planes or the respective memory blocks in the respective memory dies. Further, in the embodiment of the present disclosure, although it is described throughout this specification, as an example for the sake of convenience in explanation, that the buffers included in the memory device 150 may correspond to the plurality of page buffers 322, 324 and 326 included in the memory device 150 as described above with reference to FIG. 3, it is to be noted that the buffers may be a plurality of caches or a plurality of registers included in the memory device 150.

Also, the plurality of memory blocks included in the memory device 150 may be grouped into a plurality of super memory blocks (not shown), and command operations may be performed in the plurality of super memory blocks. Each of the super memory blocks may include a plurality of memory blocks, for example, memory blocks included in a first memory block group and a second memory block group. In this regard, in the case where the first memory block group is included in the first plane of a certain first memory die, the second memory block group may be included in the first plane of the first memory die, be included in the second plane of the first memory die or be included in the planes of a second memory die. Hereinbelow, detailed descriptions will be made through an example with reference to FIGS. 7 to 9 for performing of program operations corresponding to a plurality of write commands received from the host 102 and read operations corresponding to a plurality of read commands received from the host 102, in the plurality of memory dies included in the memory device 150, and for performing of a map update operation and a map flush operation in correspondence to performing of the program operations and the read operations, as described above, in the memory system in accordance with the embodiment of the present disclosure.

Figure 7:
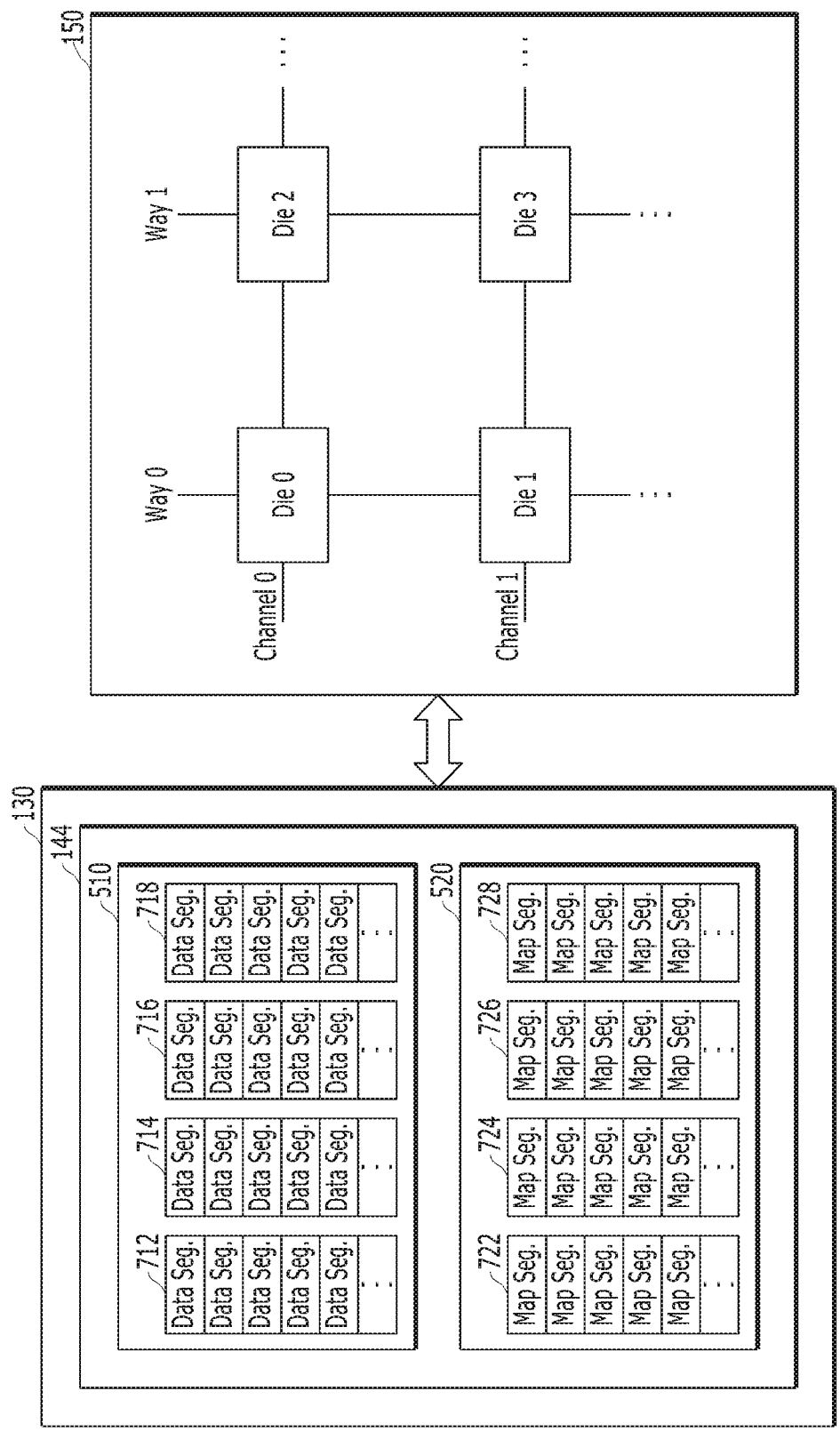

Referring to FIG. 7, when receiving a plurality of commands, for example, a plurality of write commands, a plurality of read commands and a plurality of erase commands, from the host 102, the controller 130 may perform command operations corresponding to the plurality of commands received from the host 102, for example, program operations, read operations and erase operations, in the plurality of memory dies (for example, memory dies Die 0, Die 1, Die 2, and Die 3 in FIG. 7) included in the memory device 150. The plurality of memory dies included in the memory device 150 are coupled to a plurality of channels (for example, channels Channel 0 and Channel 1 in FIG. 7) and a plurality of ways (for example, ways Way 0 and Way 1 in FIG. 7), and the controller 130 may perform the commands operations corresponding to the plurality of commands received from the host 102, in the plurality of memory dies included in the memory device 150, in consideration of channel interleaving, way interleaving and memory die interleaving. In particular, the controller 130 may performs program operations corresponding to a plurality of write commands received from the host 102, in the memory dies of the memory device 150, in consideration of interleaving, perform read operations corresponding to a plurality of read commands received from the host 102, in the memory dies of the memory device 150, in consideration of interleaving, and perform a map update operation and a map flush operation for map data in correspondence to performing of the program operations and the read operations, in the memory dies of the memory device 150.

In detail, the controller 130 may perform program operations corresponding to write commands received from the host 102, in the plurality of memory dies included in the memory device 150, in consideration of channel interleaving, way interleaving and memory die interleaving. The controller 130 may store user data corresponding to the program operations, in the first buffer 510 included in the memory 144 of the controller 130, and store map data corresponding to the program operations, in the second buffer 520 included in the memory 144 of the controller 130. The controller 130 may perform read operations corresponding to read commands received from the host 102, in the plurality of memory dies included in the memory device 150, in consideration of channel interleaving, way interleaving and memory die interleaving. The controller 130 may store user data corresponding to the read operations, in the first buffer 510 included in the memory 144 of the controller 130, and store map data corresponding to the read operations, in the second buffer 520 included in the memory 144 of the controller 130.

The memory device 150 may include the plurality of memory dies which are coupled to a plurality of channels and a plurality of ways, and index information on the channels and ways coupled to the respective memory dies may be included in metadata and may then be stored in the memory 144 of the controller 130 and the memory device 150. For example, among the memory dies included in the memory device 150, a memory die 0 (denoted as "Die 0") is coupled to a channel 0 (denoted as "Channel 0") and a way 0 (denoted as "Way 0"), a memory die 1 (denoted as "Die 1") is coupled to a channel 1 (denoted as "Channel 1") and the way 0, a memory die 2 (denoted as "Die 2") is coupled to the channel 0 and a way 1 (denoted as "Way 1"), and a memory die 3 (denoted as "Die 3") is coupled to the channel 1 and the way 1. Hereinbelow, detailed descriptions will be made for program operations and read operations for the memory die 0, the memory die 1, the memory die 2 and the memory die 3 included in the memory device 150 and a map update operation and a map flush operation in correspondence to the program operations and the read operations.

In other words, when receiving a plurality of write commands from the host 102, the controller 130 may store user data corresponding to the write commands, in the first buffer 510 included in the memory 144 of the controller 130, and program and store the user data stored in the first buffer 510, in the memory die 0, the memory die 1, the memory die 2 and the memory die 3 of the memory device 150. In correspondence to the user data that are stored in the memory die 0, the memory die 1, the memory die 2 and the memory die 3, the controller 130 may store map data in the second buffer 520 included in the memory 144 of the controller 130. As described above, first map data and second map data are stored in the second buffer 520. In particular, the map segments of the first map data and the second map data are stored in the second buffer 520. Moreover, third map data for the first map data and the second map data are stored in the second buffer 520. In particular, the map segments of the third map data are stored in the second buffer 520.

In the case where user data corresponding to the write commands received from the host 102 are sequential user data, that is, when the pattern of the write commands received from the host 102 is a sequential write pattern, the controller 130 may store first data segments 712, second data segments 714, third data segments 716 and fourth data segments 718 corresponding to the sequential user data, in the first buffer 510. That is, in the first buffer 510, data segments 712, 714, 716 and 718 of the sequential user data may be stored. The controller 130 may store the first data segments 712, the second data segments 714, the third data segments 716 and the fourth data segments 718 which are stored in the first buffer 510, in the memory dies of the memory device 150. The controller 130 may store the first data segments 712, the second data segments 714, the third data segments 716 and the fourth data segments 718 in the memory die 0, the memory die 1, the memory die 2 and the memory die 3, in consideration of channel interleaving, way interleaving and memory die interleaving. In the embodiment of the present disclosure, for the sake of convenience in explanation, it will be described as an example that the controller 130 sequentially performs sequential program operations in the memory die 0, the memory die 1, the memory die 2 and the memory die 3 according to channel interleaving, way interleaving and memory die interleaving.

Namely, the controller 130 may program and store the first data segments 712 stored in the first buffer 510, in the memory die 0 of the memory device 150, program and store the second data segments 714 stored in the first buffer 510, in the memory die 1 of the memory device 150, program and store the third data segments 716 stored in the first buffer 510, in the memory die 2 of the memory device 150, and then program and store the fourth data segments 718 stored in the first buffer 510, in the memory die 3 of the memory device 150. In correspondence to the first data segments 712 that are stored in the memory die 0, the controller 130 may generate and update first map segments 722, and then, flush and store the first map segments 722 in the memory dies of the memory device 150. In correspondence to the second data segments 714 that are stored in the memory die 1, the controller 130 may generate and update second map segments 724, and then, flush and store the second map segments 724 in the memory dies of the memory device 150. In correspondence to the third data segments 716 that are stored in the memory die 2, the controller 130 may generate and update third map segments 726, and then, flush and store the third map segments 726 in the memory dies of the memory device 150. In correspondence to the fourth data segments 718 that are stored in the memory die 3, the controller 130 may generate and update fourth map segments 728, and then, flush and store the fourth map segments 728 in the memory dies of the memory device 150. The map segments 722, 724, 726 and 728, which are generated and updated in correspondence to the data segments 712, 714, 716 and 718 that are stored in the memory dies of the memory device 150, may be stored in the second buffer 520.

In particular, the controller 130 may store user data and map data corresponding to a plurality of write commands received from the host 102, in the memory dies of the memory device 150 as described above. In particular, when the user data corresponding to the write commands received from the host 102 are sequential user data, in each cycle, the controller 130 may program and store the data segments of the user data in the memory dies of the memory device 150, and generate and update the map segments of the map data and flushes and stores the map segments in the memory dies of the memory device 150. For instance, in a first cycle, the controller 130 sequentially programs and stores the first data segments 712, the second data segments 714, the third data segments 716 and the fourth data segments 718 which are stored in the first buffer 510, in the memory die 0, the memory die 1, the memory die 2 and the memory die 3 of the memory device 150, and sequentially generates and updates the first map segments 722, the second map segments 724, the third map segments 726 and the fourth map segments 728 and then flushes and stores them in the memory dies of the memory device 150. The controller 130 may update third map data for the first map segments 722, the second map segments 724, the third map segments 726 and the fourth map segments 728 in the first cycle. In particular, in correspondence to a map update operation and a map flush operation for the first map segments 722, the second map segments 724, the third map segments 726 and the fourth map segments 728 in the first cycle, the controller 130 may update and then store third map data (hereinafter, referred to as 'first cycle third map data'). Since map information including location information on first map data and second map data are included in the third map data, the map segments of the third map data include map information indicating the locations of the first map segments 722, the second map segments 724, the third map segments 726 and the fourth map segments 728. The map segments of the third map data may be stored in the second buffer 520 of the memory 144, and then, may be flushed and stored in the memory dies of the memory device 150. In a second cycle after the first cycle, the controller 130 may program and store the data segments of user data in the memory dies of the memory device 150, and generate and update the map segments of map data, and then flush and store the map segments in the memory dies of the memory device 150.

Figure 8:
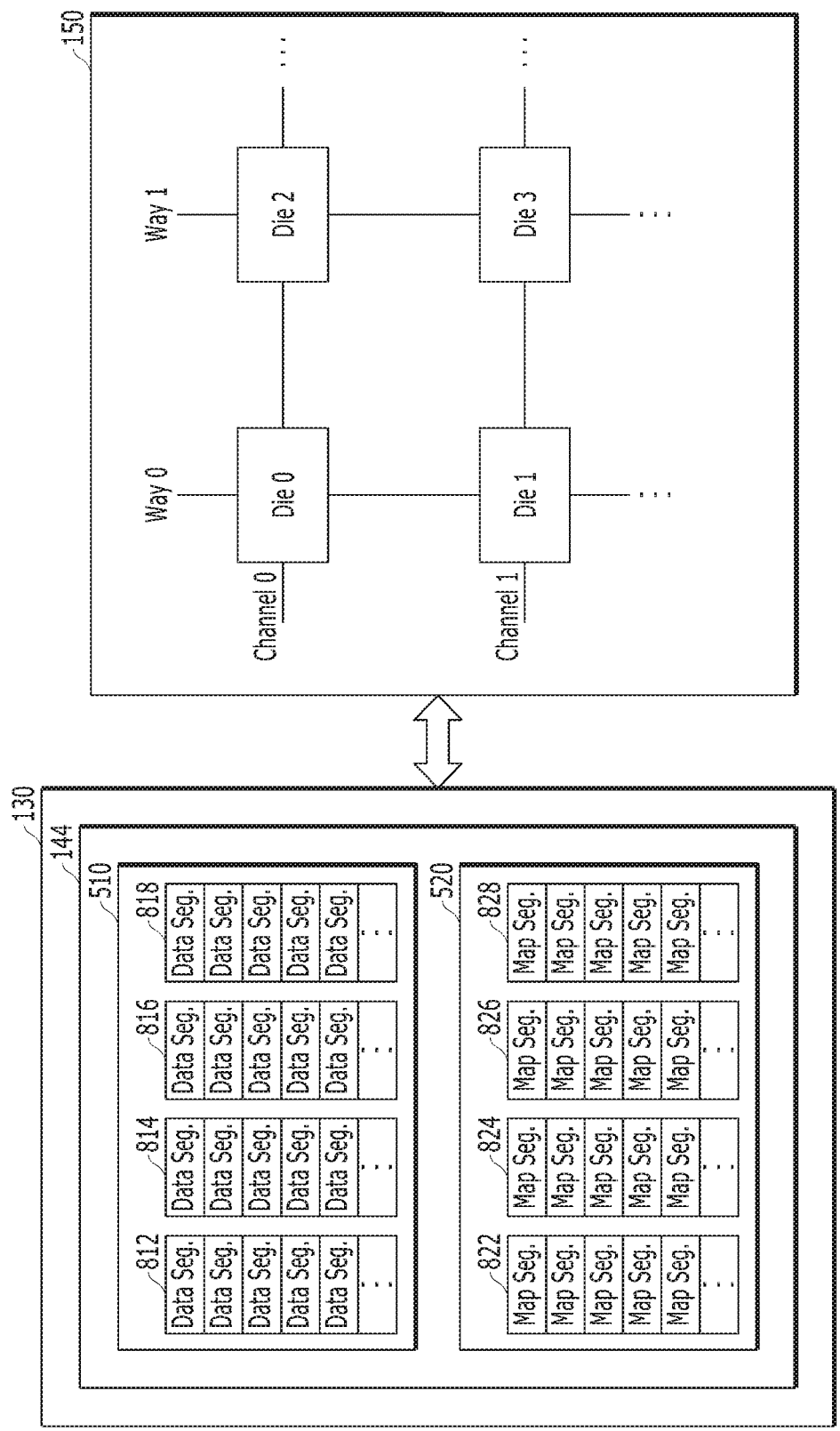

That is, referring to FIG. 8, when user data corresponding to write commands received from the host 102 are sequential user data, in the second cycle, the controller 130 may store fifth data segments 812, sixth data segments 814, seventh data segments 816 and eight data segments 818 corresponding to the sequential user data, in the first buffer 510. In the first buffer 510, data segments 812, 814, 816 and 818 of the sequential user data may be stored. The controller 130 may store the fifth data segments 812, the sixth data segments 814, the seventh data segments 816 and the eighth data segments 818 which are stored in the first buffer 510, in the memory dies of the memory device 150. The controller 130 may sequentially program and store the fifth data segments 812, the sixth data segments 814, the seventh data segments 816 and the eighth data segments 818 in the memory die 0 (denoted as Die 0), the memory die 1 (denoted as Die 1), the memory die 2 (denoted as Die 2) and the memory die 3 (denoted as Die 3), in consideration of channel interleaving, way interleaving and memory die interleaving.

Namely, in the second cycle, the controller 130 may program and store the fifth data segments 812 stored in the first buffer 510, in the memory die 0 of the memory device 150, program and store the sixth data segments 814 stored in the first buffer 510, in the memory die 1 of the memory device 150, programs and stores the seventh data segments 816 stored in the first buffer 510, in the memory die 2 of the memory device 150, and then program and store the eighth data segments 818 stored in the first buffer 510, in the memory die 3 of the memory device 150. In the second cycle, in correspondence to the fifth data segments 812 that are stored in the memory die 0, the controller 130 may generate and update fifth map segments 822, and then, flush and store the fifth map segments 822 in the memory dies of the memory device 150. In the second cycle, in correspondence to the sixth data segments 814 that are stored in the memory die 1, the controller 130 may generate and update sixth map segments 824, and then, flush and store the sixth map segments 824 in the memory dies of the memory device 150. In the second cycle, in correspondence to the seventh data segments 816 that are stored in the memory die 2, the controller 130 may generate and update seventh map segments 826, and then, flush and store the seventh map segments 826 in the memory dies of the memory device 150. In the second cycle, in correspondence to the eighth data segments 818 that are stored in the memory die 3, the controller 130 may generate and update eighth map segments 828, and then, flush and store the eighth map segments 828 in the memory dies of the memory device 150. The map segments 822, 824, 826 and 828, which are generated and updated in correspondence to the data segments 812, 814, 816 and 818 that are stored in the memory dies of the memory device 150, may be stored in the second buffer 520.

That is, in the second cycle, the controller 130 may sequentially program and store the fifth data segments 812, the sixth data segments 814, the seventh data segments 816 and the eighth data segments 818 which are stored in the first buffer 510, in the memory die 0, the memory die 1, the memory die 2 and the memory die 3 of the memory device 150, and sequentially generate and update the fifth map segments 822, the sixth map segments 824, the seventh map segments 826 and the eighth map segments 828 and then flush and store them in the memory dies of the memory device 150. The controller 130 may update third map data for the fifth map segments 822, the sixth map segments 824, the seventh map segments 826 and the eighth map segments 728 in the second cycle. In particular, in correspondence to a map update operation and a map flush operation for the fifth map segments 822, the sixth map segments 824, the seventh map segments 826 and the eighth map segments 828 in the second cycle, the controller 130 may update and then store third map data (hereinafter, referred to as 'second cycle third map data'). Since map information including location information on first map data and second map data are included in the third map data, the map segments of the third map data include map information indicating the locations of the fifth map segments 822, the sixth map segments 824, the seventh map segments 826 and the eighth map segments 828. The map segments of the third map data may be stored in the second buffer 520 of the memory 144, and then, may be flushed and stored in the memory dies of the memory device 150.

In particular, when updating the second cycle third map data, the controller 130 loads the first cycle third map data in the second buffer 520 of the memory 144, checks the map segments of the first cycle third map data, and performs a map update operation for the second cycle third map data. After updating the first cycle third map data and the second cycle third map data, the controller 130 flushes and stores the first cycle third map data and the second cycle third map data which are updated, in the memory dies of the memory device 150. Hereinbelow, detailed descriptions will be made with reference to FIG. 9, which illustrates an example of performing command operations corresponding to commands received from the host 102, in the memory dies of the memory device 150, and then performing a map update operation and a map flush operation in correspondence to the performing of the command operations, in the memory system in accordance with the embodiment.

Figure 9:
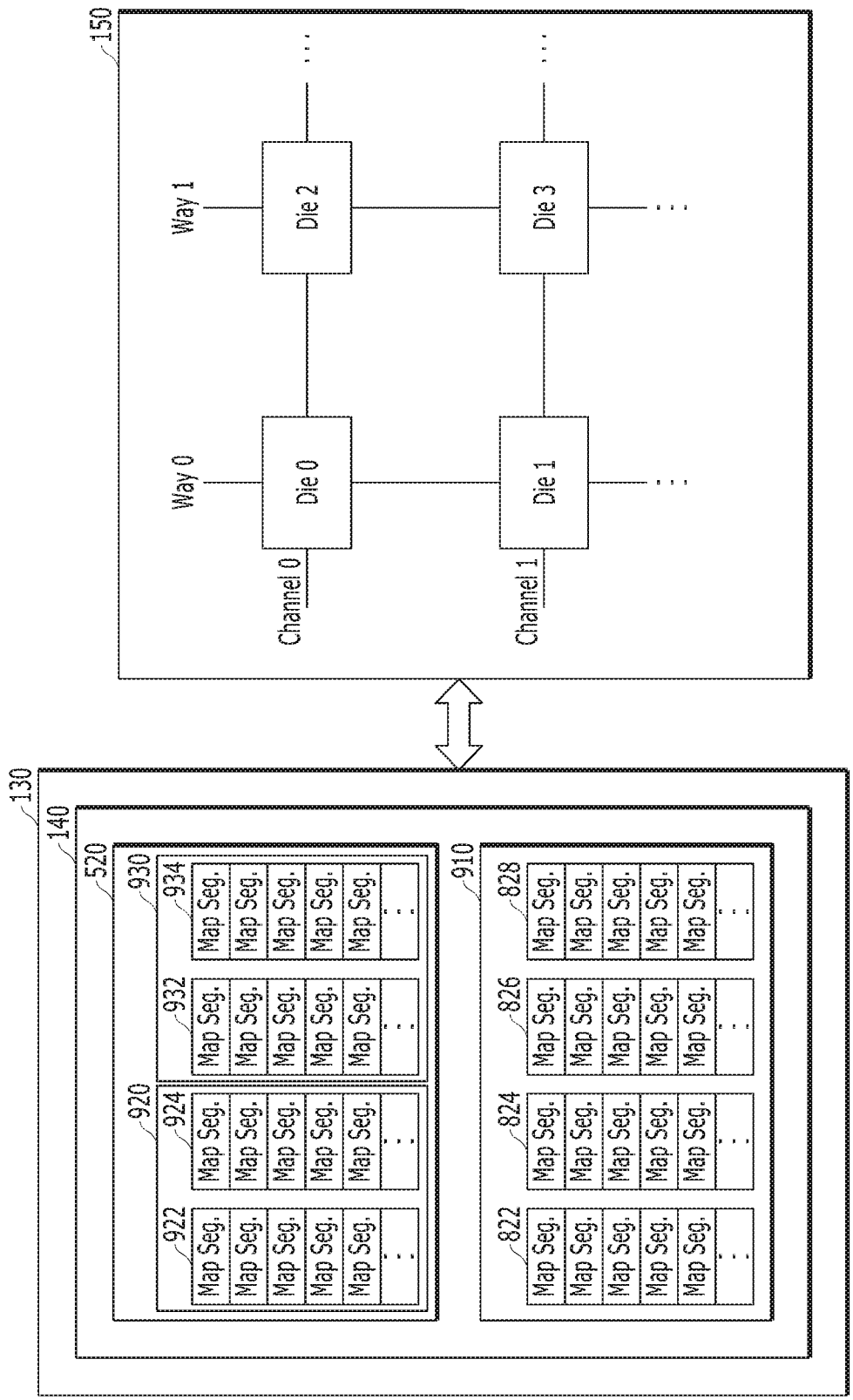

Referring to FIG. 9, as described above, in the first cycle, the controller 130 may sequentially program and store the first data segments 712, the second data segments 714, the third data segments 716 and the fourth data segments 718 which are stored in the first buffer 510, in the memory die 0, the memory die 1, the memory die 2 and the memory die 3 of the memory device 150, and sequentially generate and update the first map segments 722, the second map segments 724, the third map segments 726 and the fourth map segments 728. Then, the controller 130 may flush and store the map segments 722, 724, 726, and 728 in the memory dies of the memory device 150. After performing the map update operation and the map flush operation for the first map segments 722, the second map segments 724, the third map segments 726 and the fourth map segments 728, in correspondence to the map update operation and the map flush operation in the first cycle, the controller 130 may update third map data. The controller 130 may update the map segments of third map data in which map information as location information on the first map segments 722, the second map segments 724, the third map segments 726 and the fourth map segments 728 in the first cycle, and flush and store the map segments of the first cycle third map data in the memory dies of the memory device 150. When performing the map update operation and the map flush operation in the second cycle, the controller 130 may load the map segments of the first cycle third map data in the second buffer 520 of the memory 144, and then, check the map segments of the first cycle third map data.

For example, when receiving a plurality of write commands from the host 102, the controller 130 may perform program operations corresponding to the write commands. In this regard, the controller 130 may allocate the first buffer 510 and the second buffer 520 in the memory 144, store the data segments of user data in the first buffer 510, and store the map segments of map data in the second buffer 520. The controller 130 may allocate map buffer regions in the second buffer 520 of the memory 144. In particular, the controller 130 may allocate a first map buffer region 910 which stores the map segments of first map data and second map data, and a second map buffer region 920 and a third map buffer region 930 which store the map segments of third map data.

After performing the map update operation and the map flush operation in the first cycle, that is, updating the first map segments 722, the second map segments 724, the third map segments 726 and the fourth map segments 728 and flushing and storing them in the memory dies of the memory device 150 in the first cycle, the controller 130 may update the map segments of the first cycle third map data, and store the map segments of the updated first cycle third map data in the memory dies of the memory device 150. After sequentially programming and storing the data segments 812, 814, 816 and 818 in the memory dies of the memory device 150 in the second cycle, when performing the map update operation and the map flush operation in the second cycle, the controller 130 may load the map segments of the first cycle third map data in the second buffer 520, and then, perform the map update operation and the map flush operation in the second cycle.

In particular, the controller 130 may load the map segments of the first cycle third map data in the second buffer region 920 of the second buffer 520, and copy and load map segments 922 and 924 of the first cycle third map data loaded in the second buffer region 920, in the third buffer region 930. Segments 932 and 934 of the first cycle third map data loaded in the third buffer region 930 become backup copy data for the segments 922 and 924 of the first cycle third map data loaded in the second buffer region 920. In order to perform the map update operation in the second cycle, the controller 130 may check the segments 932 and 934 of the first cycle third map data loaded in the third buffer region 930, load the map segments 822, 824, 826 and 828 of the first map data and the second map data in the first buffer region 910 of the second buffer 520, perform the map update operation for the map segments 822, 824, 826 and 828 of the first map data and the second map data loaded in the first buffer region 910, and flush and store the updated map segments 822, 824, 826 and 828 of the first map data and the second map data, in the memory dies of the memory device 150.

In the case where, for example, as described above, sequential program operations are performed in the first cycle and the second cycle or data in the first cycle and the second cycle are sequential data or data having the same logical information (for instance, logical addresses or logical numbers), the controller 130 may check the map segments 822, 824, 826 and 828 of the first map data and the second map data updated in the second cycle, through the map segments 922, 924, 932 and 934 of the first cycle third map data. Therefore, after loading the map segments 922, 924, 932 and 934 of the first cycle third map data in the second buffer region 920 and the third buffer region 930, the controller 130 may check the map segments 822, 824, 826 and 828 of the first map data and the second map data through the map segments 922, 924, 932 and 934 of the first cycle third map data loaded in the second buffer region 920 and the third buffer region 930, and then load and update the map segments 822, 824, 826 and 828 of the first map data and the second map data in the first buffer region 910.

In correspondence to the map update operation and the map flush operation in the second cycle, that is, the map update operation and the map flush operation for the map segments 822, 824, 826 and 828 of the first map data and the second map data stored in the first buffer region 910, the controller 130 may update the second cycle third map data. The controller 130 may perform a map update operation for the second cycle third map data, through the map segments 932 and 934 of the first cycle third map data loaded in the third buffer region 930. In particular, the controller 130 may perform the map update operation for the second cycle third map data, by updating the map segments 932 and 934 of the first cycle third map data loaded in the third buffer region 930.

When receiving read commands from the host 102 while performing the map update operation in the second cycle, in particular, when receiving read commands for the user data for which the program operations are performed in the first cycle or the second cycle, the controller 130 may check the map segments 922 and 924 of the first cycle third map data loaded in the second buffer region 920, check the map segments of the first map data and the second map data of user data corresponding to the read commands, through the map segments 922 and 924 of the first cycle third map data loaded in the second buffer region 920, read the user data stored in the memory dies of the memory device 150, and provide the read user data to the host 102. The controller 130 may perform read operations through the map segments 922 and 924 of the first cycle third map data loaded in the second buffer region 920. In particular, by performing the read operations through the map segments 922 and 924 of the first cycle third map data which are completely updated after program operations are normally performed, the read operations may be normally performed.

After performing the map update operation for the map segments of the second cycle third map data through the map segments 932 and 934 of the first cycle third map data loaded in the third buffer region 930, the controller 130 may swap the second buffer region 920 and the third buffer region 930, and flush and store the map segments of the third map data loaded in the second buffer region 920 and the third buffer region 930, in the memory dies of the memory device 150. Through the swap, the controller 130 may update the map segments 922 and 924 of the third map data loaded in the second buffer region 920, with the map segments 932 and 934 of the third map data loaded in the third buffer region 930. Therefore, the map segments of the second cycle third map data may be loaded in the second buffer region 920 and the third buffer region 930.

The data segments 712, 714, 716 and 718 stored in the memory dies of the memory device 150 in the first cycle and the data segments 812, 814, 816 and 818 stored in the memory dies of the memory device 150 in the second cycle become the data segments of the sequential user data corresponding to the write commands of a sequential write pattern as described above. Thus, through sequential program operations, the controller 130 may store the data segments 712, 714, 716 and 718 in the first cycle and the data segments 812, 814, 816 and 818 in the second cycle, in the memory dies of the memory device 150, and perform a map update operation and a map flush operation for sequential map data in correspondence to the sequential program operations. That is, through the map segments of the first cycle third map data and the map segments of the second cycle third map data updated through the second buffer region 920 and the third buffer region 930, the controller 130 may check that the map segments 722, 724, 726 and 728 in the first cycle and the map segments 822, 824, 826 and 828 in the second cycle are the map segments of sequential map data, and update the map segments of the first map data and the second map data in the first cycle and the second cycle.

The controller 130, in accordance with an embodiment of the present invention, may perform sequential map update operations for not only the map segments of the first map data and the second map data in the first cycle and the second cycle, but also for the map segments of the third map data in the first cycle and the second cycle. Accordingly, the first map data, the second map data and the third map data in the first cycle and the second cycle may include start location information and size information, and may also include count information and offset information. The controller 130 may update sequential map data including start location information and size information, for entire map segments of the first map data, the second map data and the third map data in the first cycle and the second cycle, and then, store the updated sequential map data in the memory dies of the memory device 150. In particular, the controller 130 may update sequential map data including start location information and size information, for entire map segments, some map segments or each map segment of the first map data, the second map data and the third map data in the first cycle and the second cycle, through a map reformat operation or a map compress operation, and then, store the updated sequential map data in the memory dies of the memory device 150.

As a result, in the memory system in accordance with the embodiment of the present disclosure, when performing command operations corresponding to a plurality of commands received from the host 102, in the memory dies of the memory device 150, a map update operation and a map flush operation for the map segments of map data may be performed in correspondence to the performing of the command operations. In particular, by performing the map update operation by loading map data including location information on the map segments of the map data, in the memory 144 of the controller 130, barriers in the memory dies which are induced when performing sequential command operations and map update operations may be minimized, whereby operational performance in the memory system may be improved. Hereinbelow, an operation for processing data in a memory system in accordance with an embodiment of the present disclosure will be described in detail with reference to FIG. 10.

Figure 10:
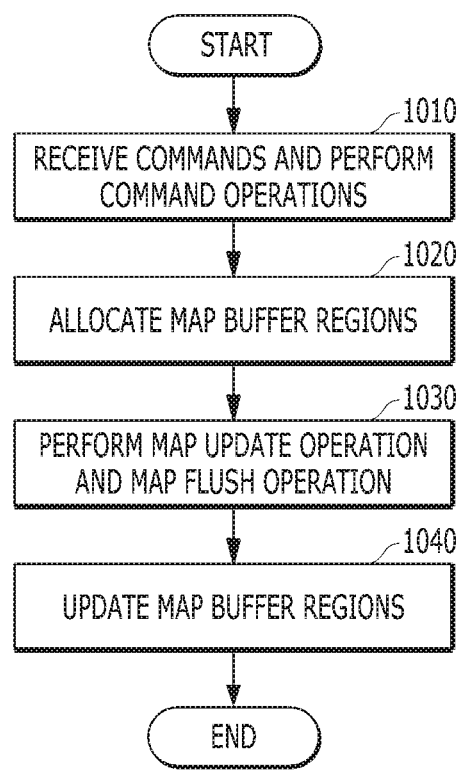
FIG. 10 is a flow chart describing an operation process for processing data in a memory system in accordance with an embodiment.

FIG. 10 is a flow chart describing an operation process for processing data in a memory system in accordance with an embodiment.

Referring to FIG. 10, at step 1010, after receiving a plurality of commands from the host 102, the memory system 110 may check the pattern of the commands received from the host 102, and perform command operations corresponding to the commands received from the host 102, in the memory dies of the memory device 150. The pattern of the commands received from the host 102 may be checked as a sequential pattern. In particular, write commands received from the host 102 may be checked as write commands of a sequential pattern.

At step 1020, the memory system 110 may allocate map buffer regions for the map segments of map data corresponding to the commands received from the host 102 and the command operations, to the memory 144 of the controller 130.

Then, at step 1030, the memory system 110 may perform a map update operation and a map flush operation for the map segments of the map data. At step 1040, in correspondence to the performing of the map update operation and the map flush operation, after updating map data including the location information of map segments, the map segments of the map data loaded in the map buffer regions are updated through swap for the map buffer regions.

Since detailed descriptions were made above with reference to FIGS. 5 to 9 for a map update operation and a map flush operation in correspondence to the performing of the command operations corresponding to a plurality of command received from the host 102, further descriptions thereof will be omitted herein. Hereinbelow, detailed descriptions will be made with reference to FIGS. 11 to 19, for a data processing system and electronic apparatuses to which the memory system 110 including the memory device 150 and the controller 130 described above with reference to FIGS. 1 to 10, in accordance with the embodiment, is applied.

FIGS. 11 to 19 are diagrams schematically illustrating application examples of the data processing system of FIG. 1.

Figure 11:
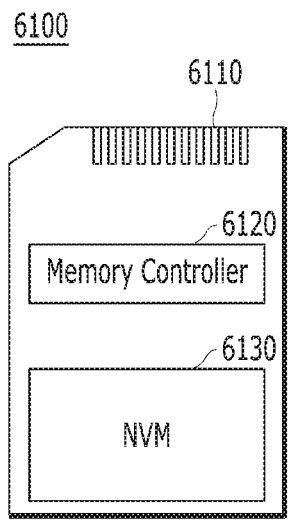
FIGS. 11 to 19 are diagrams schematically illustrating application examples of the data processing system shown in FIG. 1 in accordance with various embodiments of the present invention.

FIG. 11 is a diagram schematically illustrating another example of the data processing system including the memory system in accordance with the present embodiment. FIG. 11 schematically illustrates a memory card system to which the memory system in accordance with the present embodiment is applied.

Referring to FIG. 11, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processor, a host interface, a memory interface and an error correction component. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 12:
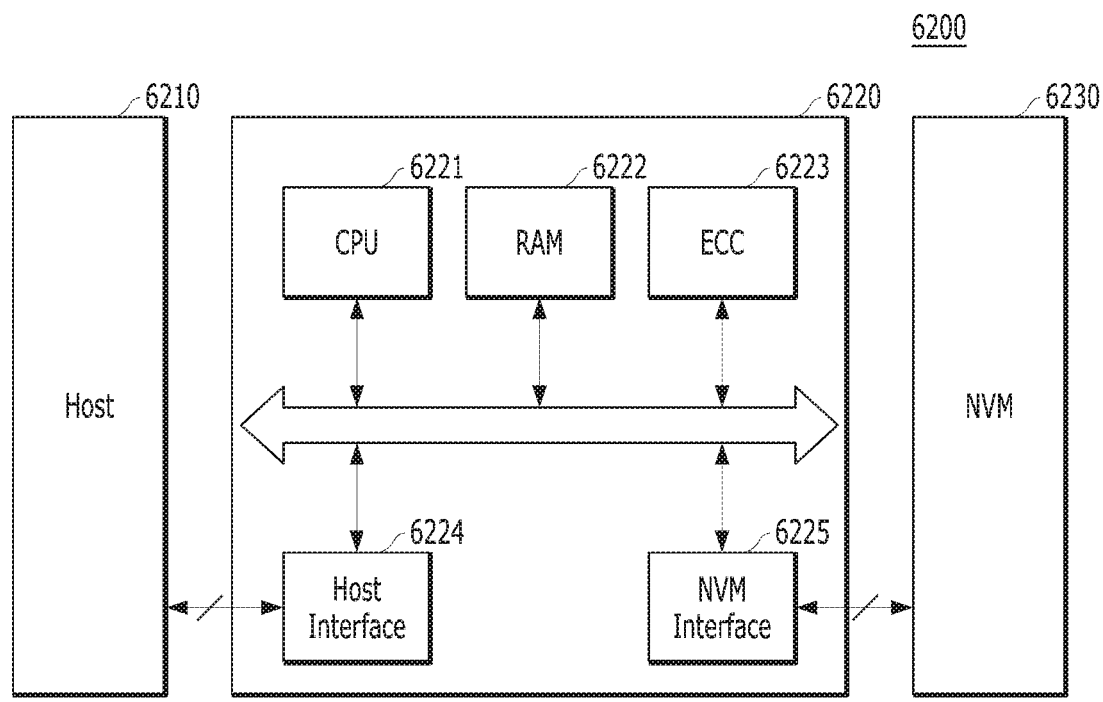

FIG. 12 is a diagram schematically illustrating another example of the data processing system including the memory system in accordance with the present embodiment.

Referring to FIG. 12, the data processing system 6200 may include a memory device 6230 having one or more nonvolatile memories and a memory controller 6220 for controlling the memory device 6230. The data processing system 6200 illustrated in FIG. 12 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 13:
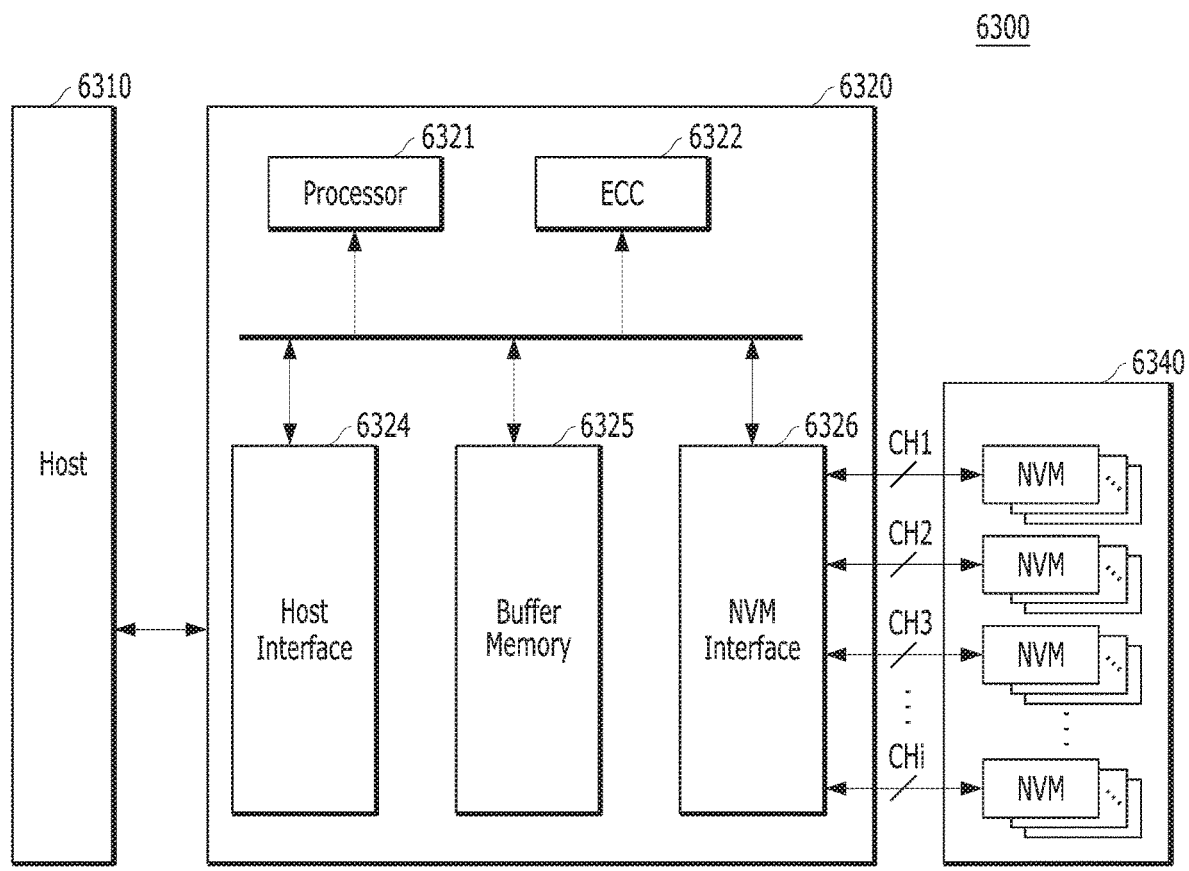

FIG. 13 is a diagram schematically illustrating another example of the data processing system including the memory system in accordance with the present embodiment. FIG. 13 schematically illustrates an SSD to which the memory system in accordance with the present embodiment is applied.

Referring to FIG. 13, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 12 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 14:
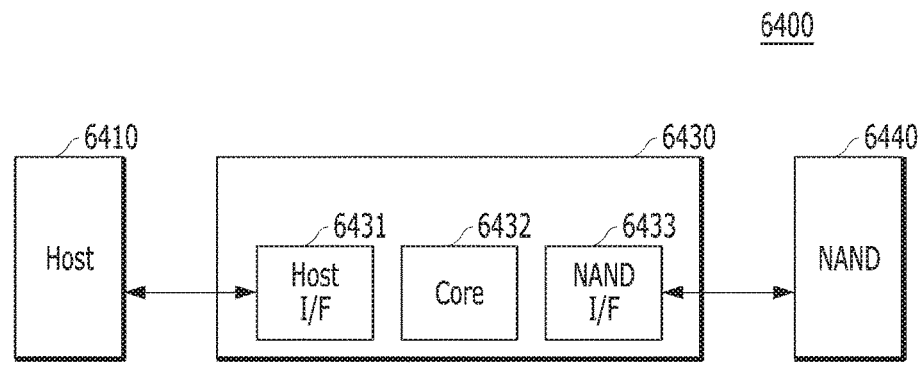

FIG. 14 is a diagram schematically illustrating another example of the data processing system including the memory system in accordance with the present embodiment. FIG. 14 schematically illustrates an embedded Multi-Media Card (eMMC) to which the memory system in accordance with the present embodiment is applied.

Referring to FIG. 14, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 15 to 18 are diagrams schematically illustrating other examples of the data processing system including the memory system in accordance with the present embodiment. FIGS. 15 to 18 schematically illustrate UFS (Universal Flash Storage) systems to which the memory system in accordance with the present embodiment is applied.

Referring to FIGS. 15 to 18, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 12 to 14, and the UFS cards 6530, 6630, 6730 and 6830 may be embodied in the form of the memory card system 6100 described with reference to FIG. 11.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 15:
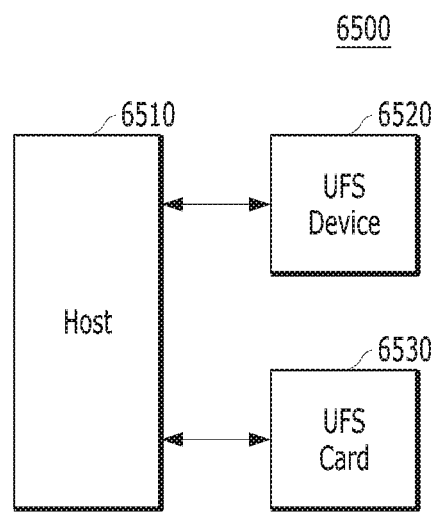

In the UFS system 6500 illustrated in FIG. 15, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 16:
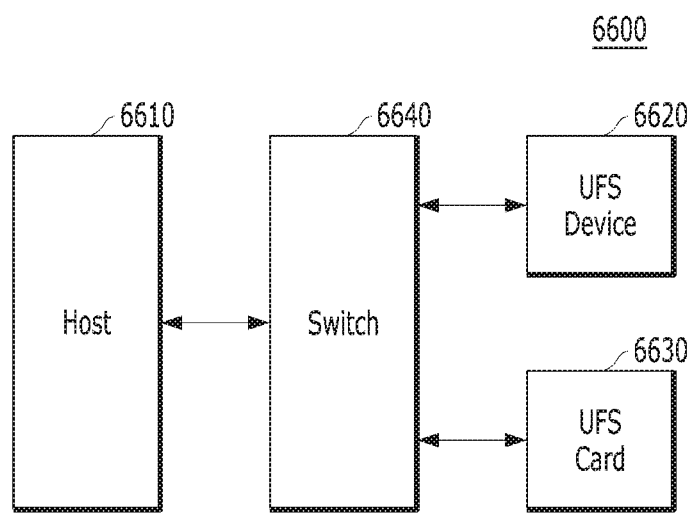

In the UFS system 6600 illustrated in FIG. 16, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 17:
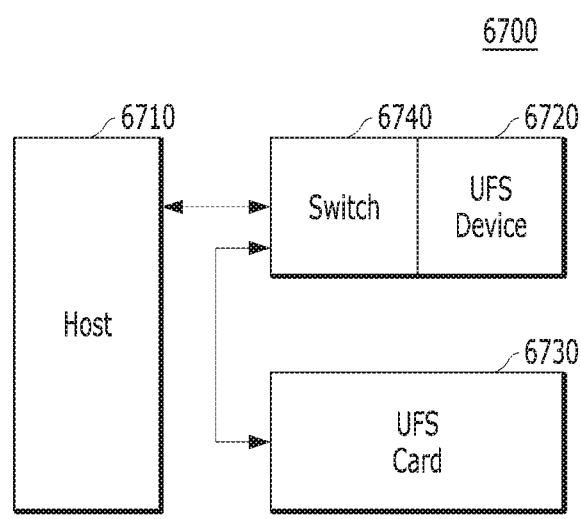

In the UFS system 6700 illustrated in FIG. 17, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 18:
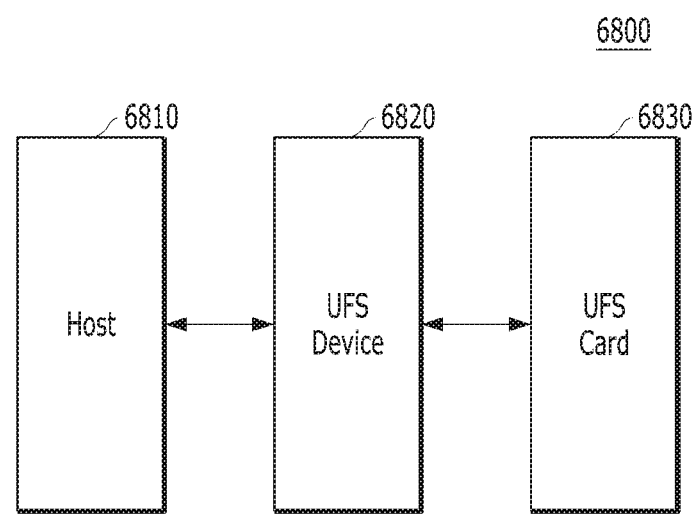

In the UFS system 6800 illustrated in FIG. 18, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 19:
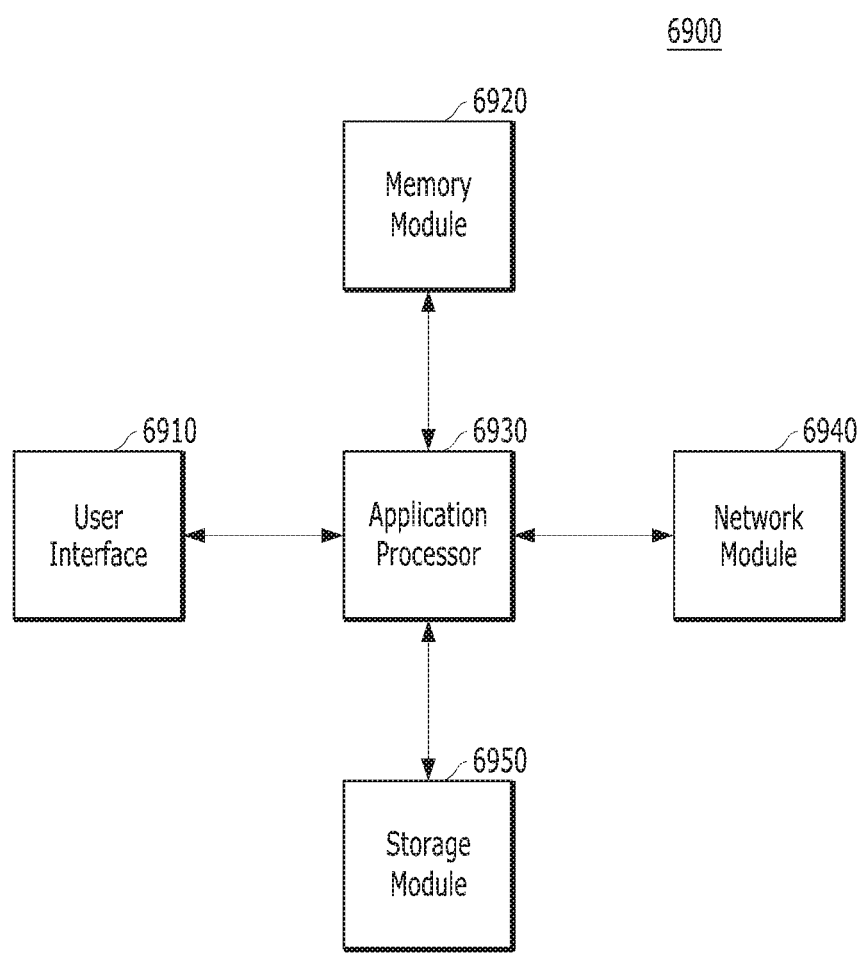

FIG. 19 is a diagram schematically illustrating another example of the data processing system including the memory system in accordance with an embodiment. FIG. 19 is a diagram schematically illustrating a user system to which the memory system in accordance with the present embodiment is applied.

Referring to FIG. 19, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 13 to 18.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

The memory system and the operating method thereof according to the embodiments may minimize complexity and performance deterioration of the memory system and maximize use efficiency of a memory device, thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device including a plurality of memory dies;
first and second buffers; and
a controller configured to:
control the memory device to perform a program operation of storing first and second sequential user data respectively during first and second cycles into the memory dies in an interleaved manner;
update first and second map data corresponding to the first and second sequential user data during the first and second cycles, respectively; and
update first and second map location data respectively indicating locations of the updated first and second map data stored in the memory dies,
wherein the controller updates the first and second map location data by:
loading the first map location data onto the first buffer and updating the loaded first map location data according to the updated first map data, during the first cycle;
loading the first map location data onto the second buffer and updating the first map location data as the second map location data according to the updated second map data, during the second cycle; and
overwriting the updated second map location data onto the first buffer.

2. The memory system of claim 1, wherein the controller is further configured to control, in response to a read request provided during the second cycle, the memory device to read the first sequential user data by referring to the first map location data in the first buffer.

* * * * *